United States Patent Office 3,697,478
Patented Oct. 10, 1972

3,697,478
POLYAMIDES FROM PSEUDO-CONJUGATED
AZO-AROMATIC DIAMINES
Hartwig C. Bach and Helmuth E. Hinderer, Pensacola,
Fla., assignors to Monsanto Company, St. Louis, Mo.
No Drawing. Continuation-in-part of abandoned application Ser. No. 782,004, Dec. 6, 1968. This application Oct. 19, 1970, Ser. No. 82,184
The portion of the term of the patent subsequent to
Mar. 17, 1987, has been disclaimed
Int. Cl. C08g 20/20, 20/22
U.S. Cl. 260—47 CZ
9 Claims

ABSTRACT OF THE DISCLOSURE

Linear polyamides derived from aromatic diacid halides and diamines containing at least one azo linkage and at least one pseudo-conjugated aromatic radical are useful in the manufacture of fibers, films and other shaped articles.

CROSS-REFERENCE TO RELATED APPLICATION

This application is a continuation-in-part of our copending application Ser. No. 782,004 which was filed on Dec. 6, 1968 and is now abandoned.

SUMMARY OF THE INVENTION

This invention relates to a class of novel film- or fiber-forming aromatic polyamides consisting essentially of recurring units having the structural formula $$\overset{O}{\underset{\|}{C}}-Ar''-\overset{O}{\underset{\|}{C}}-NH-Ar-N=N-Ar'-NH$$

wherein Ar" represents a divalent aromatic radical, Ar and Ar' represent a conjugated or pseudo-conjugated divalent aromatic radical, at least one of Ar and Ar' is a pseudo-conjugated divalent aromatic radical, and said radicals have no substitutents which are reactive with amino groups or acid halide groups. The novel polyamides can be conveniently prepared by conventional polyamidation procedures and are typically formed by reaction of at least one aromatic diacid halide with at least one diamine containing at least one azo linkage and at least one pseudo-conjugated divalent aromatic radical. Particularly when the diamines employed are symmetrical, the resulting polyamides are highly ordered polymers having excellent thermal, mechanical and electrical properties.

DETAILED DESCRIPTION OF THE INVENTION

The term conjugated is used herein with reference to aromatic radicals characterized by internal electronic interactions that are essentially the same as those of structures referred to classically as conjugated, i.e., structures having alternating single and double bonds. For example, the radical

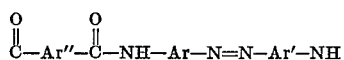

is conjugated within the meaning of the term as used herein. Certain ring-linking groups disrupt such internal electronic interactions and radicals containing such groups, e.g. radicals such as

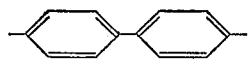

are therefore not conjugated within the meaning of the terms as used herein. On the other hand, such internal electronic interactions are not substantially disrupted by various other ring-linking groups and radicals containing aromatic rings linked by such groups are therefore referred to herein as pseudo-conjugated. Examples of such pseudo-conjugated aromatic radicals are represented by the structural formula

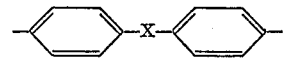

wherein X is any linking group that does not substantially disrupt the aforementioned internal electronic interactions, e.g.

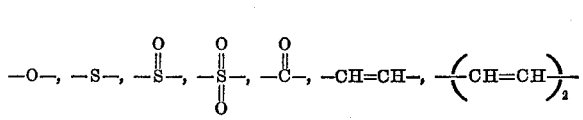

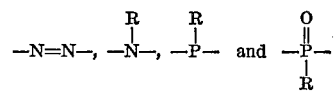

wherein R is $C_1$–$C_4$ alkyl.

The diamines employed in the preparation of the polyamides of this invention are represented by the formula $$H_2N-Ar-N=N-Ar'-NH_2$$

wherein each of Ar and Ar' is a conjugated or pseudo-conjugated divalent radical containing aromatic rings exhibiting resonance in the classic sense, e.g. rings characterized by the unsaturation of benzene, naphthalene, pyridine or a bridged diphenyl such as diphenyl ether or diphenyl sulfone, and at least one of Ar and Ar' is a pseudo-conjugated divalent aromatic radical. The rings in such radicals may be all aromatic or inclusive of at least one ring that is not aromatic and they may be all carbocyclic, all heterocyclic or inclusive of carbocyclic and heterocyclic rings. The rings in such radicals may also include fused-ring systems each of which may contain only carbocyclic rings, only heterocyclic rings or carbocyclic and heterocyclic rings. In every instance, however, the rings in such radicals are wholly or partially composed of at least two aromatic carbocyclic and/or heterocyclic rings linked (in the aforementioned conjugated radicals) by a bond between a ring-atom of each of two of said aromatic rings or (in the aforementioned pseudo-conjugated radicals) by a divalent group represented hereinbefore by X. The aforementioned heterocyclic rings may contain one or more heteroatoms such as —O—, —S—, —N= or —N— and are exemplified by the rings of pyridine, oxadiazole, thiazole, imidazole and pyrimidine.

The polyamides of this invention are generally but not exclusively prepared using diamines of such a type that the amide groups formed by polymerization of such diamines and the aforementioned aromatic diacid halide reactants are directly linked to ring atoms of the diamines. The diamines employed are also generally such that the molecular weight of the —NH—Ar—N=N—Ar'—NH— radical in the foregoing structural formula of the polyamide is not greater than about 1000, although diamines having molecular weights of up to about 2000 may be employed in some cases. In the diamines employed, each of the divalent aromatic radicals Ar and Ar' typically contains from two to five carbocyclic or heterocyclic rings although diamines containing a larger number of such rings can be used if desired. The rings in such radicals are also generally integral parts of the chain linking the two amino groups of the diamine rather than pendant from said chain.

Neutralization of one amine group of a symmetrical aromatic azo diamine from the class employed in the preparation of the polyamides of this invention (e.g. with an acid such as HCl) alters the basicity of the remaining amine group of that diamine. Examples of aromatic diamines (I) that may be used to prepare aromatic azo diamines (II) of that class include the following:

I

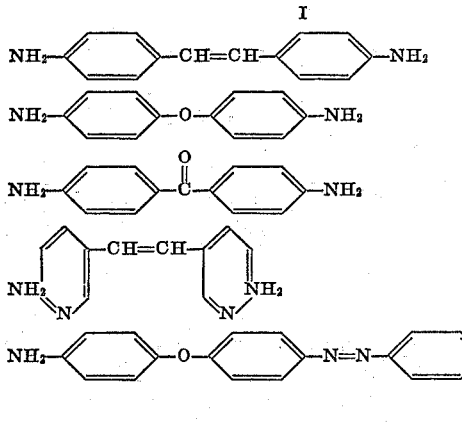

II

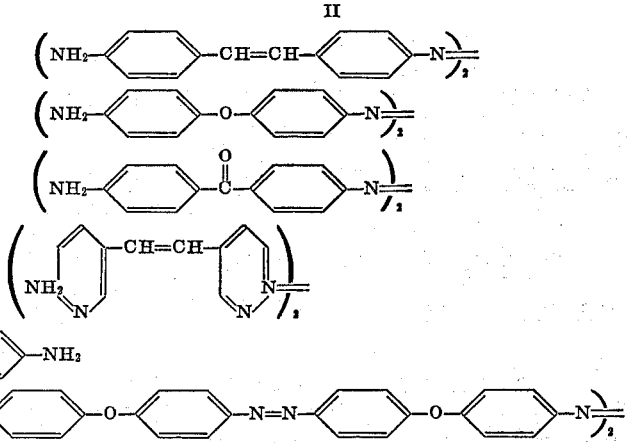

Such reactant diamines (I) are well known in the art and can be prepared by methods well known in the art.

The aromatic azo diamines employed in making the polyamides of this invention can be prepared by the oxidative coupling of symmetrical aromatic diamines in solution, utilizing a cupric ion complexed with a nitrogen base. Preferably, the oxidative solution dimerization is conducted as a catalytic process with a cupric-cuprous redox couple complexed with a nitrogen base as the catalyst, a nitrogen base as the solvent and molecular oxygen as the primary oxidant.

The active catalyst system is preferably obtained by oxidation of a cuprous salt in the presence of a nitrogen base, although some cupric salts such as cupric acetate may also be used. Any cuprous salt may be used in the practice of this invention provided that it forms a complex with the nitrogen base that is soluble in the reaction medium and that it is capable of existing in the cupric state. The particular salt used has no effect on the type of product obtained. Typical examples of cuprous salts suitable for the process are cuprous chloride, cuprous bromide, cuprous sulfate, cuprous acetate, cuprous benzoate and the like. The use of cupric salts is generally less desirable in the catalyst preparation although cupric acetate is quite effective.

It is believed that cupric ion complexed with a nitrogen base, complexes with the amino groups of the starting diamine, then oxidizes them and aids in the coupling of the resulting species. During this reaction cuprous salt or complex is formed which is reoxidized by oxygen (or its precursors such as $H_2O_2$) to the cupric state. Based on this mechanism, chemical oxidants also appear to be useful which can oxidize the cuprous ion to the cupric ion.

Since the reaction does not destroy the catalyst, only a small catalytic amount of cuprous or cupric salt needs to be used, from about 0.1 to 10 mole percent, based on the moles of aromatic diamine to be oxidized, although larger amounts can be used, as desired.

Nitrogen bases which may be used as a component of the catalyst as well as the reaction medium include all nitrogen bases except those which are oxidized by the catalyst. It is preferred to have the basicity of the nitrogen base as close as possible to that of the primary diamine starting material in order to help the reaction proceed at the most optimum rate and give better yields.

Suitable nitrogen bases include various amides such as phosphoramides, carbonamides and sulfonamides. Examples of such amides are hexamethylphosphoramide, dimethylacetamide, dimethylformamide, dimethylpropionamide, diethylacetamide, N-acetylpyrrolidone, N-ethyl pyrrolidone and the like. Of these amide bases, dimethylacetamide and hexamethylphosphoramide are generally preferred.

Other nitrogen bases, suitable for carrying out the process include aliphatic tertiary amines such as triethylamine, tributylamine, diethylmethylamine, and cyclic amines such as pyridine, n-alkyl piperidines, quinolines, isoquinolines, N-alkyl morpholines and the like. Among these, pyridine is preferred.

Mixtures of bases which form a part of the catalyst system may also be used. They may also be used in combination with compounds which act only as the reaction medium. For example, nitrobenzene is a good reaction medium, and may be used in combination with one of the aforementioned bases. Other inert solvents which do not interfere with the catalyst or are not oxidized to any appreciable extent but it may also be used as the reaction medium. It was found, in the course of this work, that reaction media in which the products of the reaction are relatively insoluble lead to a cleaner, simpler separation of product from catalyst and by-products, thus increasing the yield of symmetrical diamine obtained.

In a preferred mode of operation of the process, molecular oxygen is used as the primary oxidant and may be introduced into the reaction medium by diffusion or injection. Either 100 percent oxygen or gas mixtures containing oxygen may be used. In addition, other compounds capable of supplying oxygen, such as hydrogen peroxide may be used.

The order of addition of the various reactants is not critical. In one preferred mode of carrying out this invention, the catalyst may be prepared by oxidizing cuprous chloride in a base such as pyridine. The symmetrical primary aromatic diamine is then added and oxidatively coupled by the addition of oxygen until about the theoretical volume has been consumed.

Alternatively, the catalyst may be prepared in the same manner as described above and then added to a chilled solution of the primary aromatic diamine in the appropriate reaction medium, prior to the addition of oxygen. In either case, the amount of oxygen consumed can be measured with great accuracy, by using a closed system and a gas buret.

The preparation of the catalyst and the oxidative coupling reaction may be carried out in the temperature range of from about −30° C. to about 120° C., preferably from about −20° to about 70° C. It has been found that the catalyst preparation may be carried out conveniently and preferably at room temperature. The rate of reaction is satisfactory at these temperatures and a very efficient catalyst is produced.

The surprising feature of the oxidative coupling reaction is that the dimer product obtained is essentially the only product resulting from the process. The selective oxidation of one amino group of the symmetrical diamine, to the exclusion of the other amino group, which is equally reactive, is indeed unexpected.

Although the exact reason for this selectivity is unknown, it is believed that the amino groups of the conjugated diamine product are less basic than those of the starting material, due to the increased degree of conjugation. Thus, the catalyst reacts preferentially with the more basic amino groups of the starting materials, as long as they are present in the mixture. This theory is further strengthened by the fact that greater care must be taken in controlling the reaction conditions, as the difference in basicity of the starting material and product becomes smaller, in order to obtain high yields of pure dimer.

Determination of the basicities of the amino groups of the starting diamine and the product can be helpful in predicting suitable conditions for carrying out the reaction. In general, as the difference in basicity between the amino groups of the starting material and product increases, the range of reaction conditions which can be used satisfactorily in the practice of this invention is broadened; conversely, as the difference in basicity becomes smaller, the range of conditions is narrowed.

The optimum reaction conditions to be used for carrying out the process will be dependent in large part on the structure and molecular weight of the starting material and final product. These conditions may be easily optimized by those skilled in the art.

The aromatic polyamides of this invention may be prepared by reacting an aromatic azo diamine of the type above-described with an aromatic diacid halide having the formula

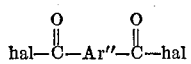

wherein hal is a halogen (e.g. chlorine) and wherein Ar" is a divalent aromatic radical containing at least one aromatic ring exhibiting resonance in the classic sense, e.g. a ring characterized by the benzenoid unsaturation of benzene, naphthalene or a bridged diphenyl such as diphenyl ether or diphenyl sulfone. When Ar" is a single-ring radical, that ring may be carbocyclic or heterocyclic. When Ar" is a multi-ring radical, the rings in said radical may be all aromatic or inclusive of at least one ring that is not aromatic and they may be all carbocyclic, all heterocyclic or inclusive of carbocyclic and heterocyclic rings. The rings in such a multi-ring radical may be wholly or partially composed of fused-ring systems which may contain only carbocyclic rings, only heterocyclic rings or carbocyclic and heterocyclic rings or they may be wholly or partially composed of at least two carbocyclic and/or heterocyclic rings linked by a bond between a ring atom of each of said rings or by a divalent radical such as

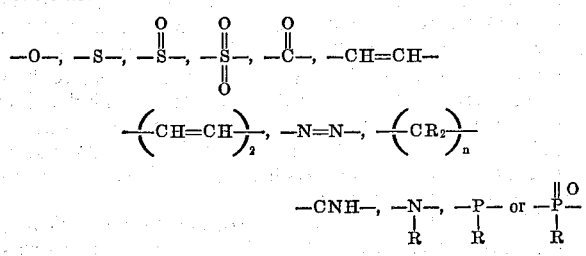

wherein R is lower (e.g. $C_1$–$C_4$) alkyl radical and $n$ is an integer from 1 to 6. The aforementioned heterocyclic rings may contain one or more heteroatoms such as $$-O-, \ -S-, \ -N= \ or \ -\overset{|}{N}-$$

and are exemplified by pyridine, oxadiazole, thiazole, imidazole and pyrimidine rings.

The polyamides of this invention are generally but not exclusively prepared using diacid halides of such a type that the amide groups formed by polymerization of such diacid halides and the aforementioned azo diamines are directly linked to ring atoms of the diacid halides. The diacid halides employed are also generally such that the molecular weight of the

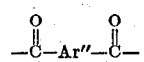

radical in the foregoing structural formula of the polyamide is not greater than about 700, although diacid halides having molecular weights of up to about 1000 may be employed in some cases. In the diacid halides employed, the divalent aromatic radical Ar" typically contains one to five carbocyclic or heterocyclic rings although diacid halides containing a larger number of such rings can be used if desired. The rings in such Ar" radicals are also generally integral parts of the chain linking the two acid halide groups of the diacid halide rather than pendant from said chain. Examples of such aromatic diacid halides, in which the Ar" radical is symmetrical in most instances but may be alternatively asymmetrical, include isophthaloyl chloride, terephthaloyl chloride, bibenzoyl chloride and 2,6-naphthalene dicarbonyl chloride.

In many instances, the aromatic divalent radicals (Ar, Ar' and Ar") of the polyamides of this invention have no substituents that are pendent from the rings in said radicals. However, many other examples of those polyamides have advantageous properties (i.e. greater solubility in conveniently-used solvents) attributable to the presence of such ring-pendent substituents. To minimize crosslinkages, the polyamides are generally prepared by reaction of diamines and diacid halides having no such ring-pendent substituents that are reactive with amino or acid halide groups (particularly under the aforedescribed polymerization conditions) and, accordingly, the divalent aromatic radicals of the polyamides of this invention have no ring pendent substituents of that type. Nitro groups, halo (e.g. chloro) groups, nitrile groups, $C_1$–$C_4$ alkyl (e.g. methyl) groups, $C_1$–$C_4$ alkoxy (e.g. methoxy) groups, carboxyl groups and $C_2$–$C_5$ carbalkoxy groups are examples of substituents that are not reactive with amino or acid halide groups and which may therefore be pendent from the rings of the aforementioned divalent aromatic radicals (Ar, Ar' and/or Ar") in any numbers consistent with the foregoing generic descriptions of the diamines and diacid halides containing such radicals.

Examples of the polyamides of this invention include those having the following structural formulae:

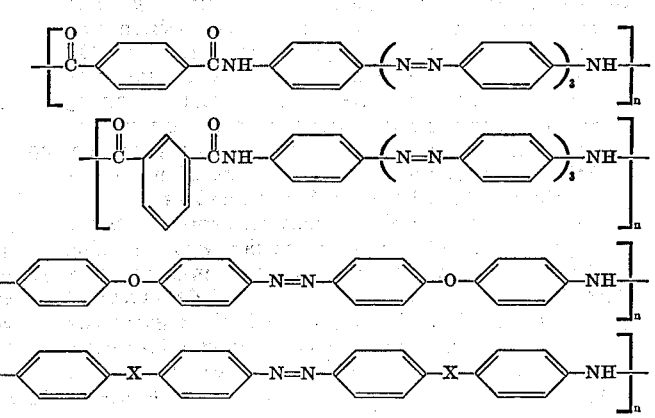

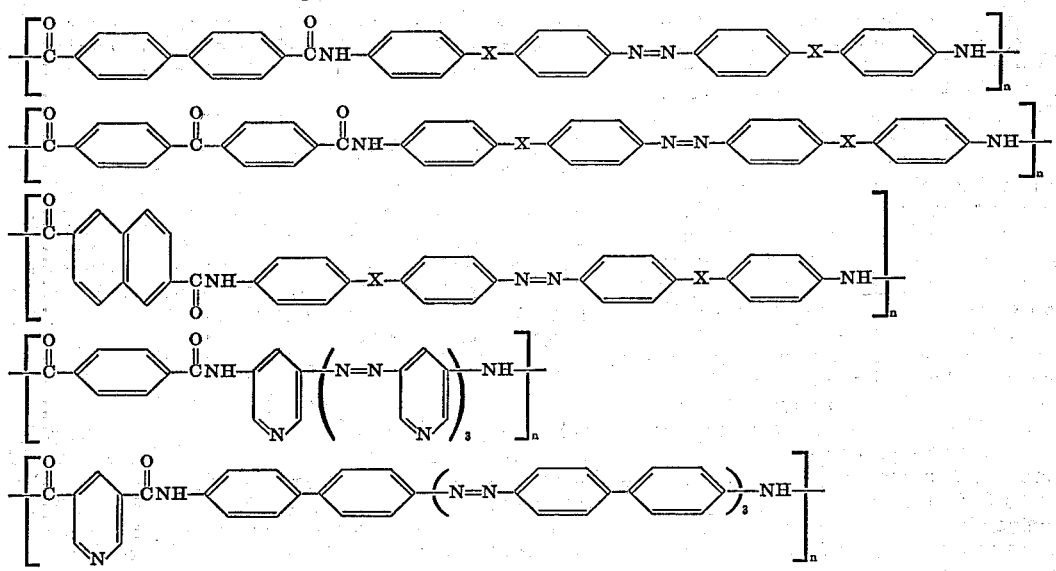

wherein X has the meaning above-described.

The polymers of this invention may be prepared using well known solution or interfacial reaction techniques. The solution method is usually preferred, since the polymer can be spun directly to fibers from the polymerization solution without filtering, washing or drying.

The solution method generally involves dissolving or slurrying the diamine monomer in a suitable solvent for the polymer, which is inert to the polymerization reaction. Among such solvents there may be mentioned dimethylacetamide, N-methyl-2-pyrrolidone, hexamethylphosphoramide (HPT) and the like or mixtures of the above. These solvents are rendered more effective in many instances by mixing them with a small amount, up to 10 percent, of an alkali or alkaline earth metal salt such as lithium chloride, magnesium bromide, calcium chloride and the like. The preferred solvent for the polymerization reaction is dimethylacetamide or dimethylacetamide containing a small amount of dissolved salts.

In the preparation of polymers, the diamine monomer solution is cooled to between 20 and −30° C. and the diacid halide is added, either as a solid or in a solution of one of the aforementioned solvents. The mixture is stirred until polymerization is substantially complete and a high molecular weight is attained. The viscous polymer solution may be spun per se or the polymer may be isolated by pouring the mixture into a non-solvent, washing and drying the polymer and then preparing the spinning solution.

For best results, the hydrogen halide, formed as a by-product of the polymerization reaction, should be neutralized or removed to prevent its harmful effects to the resulting articles. Neutralization may be conveniently accomplished by adding a proton acceptor such as an alkali or alkaline earth, metal base, to form a salt and water. Suitable proton acceptors include sodium carbonate, calcium carbonate, lithium hydroxide and the like. As a result of the neutralization reaction, the polymers may be further dissolved in the solvent, containing an amount of salt and water proportional to the amount of hydrogen halide present. Although not absolutely essential, the addition of small amounts of water improves the stability of these polymer solutions.

The proportions of the various reactants which are employed in the polymerization reaction vary according to the type of polymer desired. In most instances, substantially equimolar proportions or a slight excess of diamine to diacid halide are preferred. The number (n) of the recurring units in the foregoing structural formulae of the polyamides of this invention represents the number sufficient to provide the average molecular weight needed for film- or fiber-forming properties which are generally coincident with an inherent viscosity $$\left(\frac{\log_e \eta_r}{C}\right)$$

of at least about 0.4 as measured using a solution of 0.2 gram of the polyamide in 100 milliliters of a suitable solvent, e.g. concentrated sulfuric acid or an amide solvent such as dimethyl acetamide.

The interfacial polymerization reaction is conducted by mixing water, an emulsifier and the diamine which may be in the form of its dihydrochloride. A proton acceptor, such as sodium carbonate is then added and the mixture stirred rapidly. During this rapid stirring, a solution of the dicarbonyl monomer in an inert organic solvent such as chloroform, methylene chloride or tetrahydrofuran is added, and the mixture stirred until the polymerization reaction is complete. The polymer is then isolated by filtration, followed by washing and drying. Suitable emulsifying agents for interfacial polymerization include anionic and nonionic compounds such as sodium lauryl sulfate and the like.

The products of this invention are useful in a wide range of textile and other industrial applications. In the form of fibers, filaments and films, the polymers of this invention are thermally and U.V. resistant as well as being resistant to other types of chemical degradation. Furthermore, because of the conjugated block diamines used in their preparations, products fabricated from the polymers of this invention have been found to have superior electrical properties, such as conductivity, and tensile properties such as modulus.

The invention is further illustrated by the following examples which are not intended to be limitnig in any way.

Example I.—Poly(isophthalamide) of 4,4'-bis(p-aminophenylazo)azobenzene

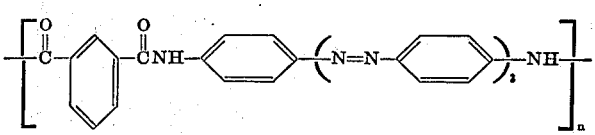

At 0° C., 0.203 g. (0.001 mole) of isophthaloyl chloride was added to a solution of 0.42 g. (0.001 mole) of 4,4'-bis(p-aminophenylazo)-azobenzene in 5.0 ml. of dimethylacetamide (DMAc)/5% LiCl. The mixture was stirred 7 min. at 0° C., then at ambient temperature. Dope viscosity increased sharply, necessitating successive dilution with solvent. A strong, transparent, red-brown film was cast from the dope. By coagulation in water a purple-red polymer was obtained. Inherent viscosity (solution of 0.1 g. of polymer in 20 ml. of DMAc/5% LiCl, 30° C.): 0.8

Example II.—Poly(terephthalamide) of 4,4'-bis(p-aminophenylazo)azobenzene

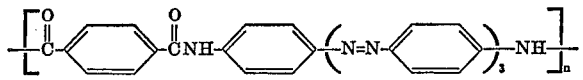

At 0° C., 0.406 g. (0.002 mole) of terephthaloyl chloride was added to a solution of 0.84 g. (0.002 mole) of 4,4'-bis(p - aminophenylazo) - azobenzene in 36 ml. of DMAc/5% LiCl. The increasingly viscous mixture was stirred at ambient temperature for 17 hrs. By coagulation in water a dark-red polymer was obtained. Inherent viscosity (solution of 0.1 g. of polymer in 20 ml. of conc. $H_2SO_4$, 30° C.): 1.7.

Example III.—Poly(terephthalamide) of 4,4'-bis(4-aminophenoxy)azobenzene

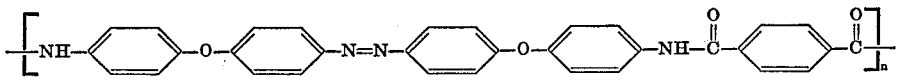

Terephthaloyl chloride (0.406 g., 2 mmoles) was added to a chilled solution of 4,4'-bis(4-aminophenoxy)azobenzene (0.792 g., 2 mmoles) in a mixture of 7 ml. of HPT and 3 ml. of DMAc. The polymerization was conducted at 0° for 5 min., then at room temperature for 4 hrs. Lithium carbonate (0.14 g.) was added, and after stirring for several hours the brown dope was cast into films dried initially at 100° for 1 hr. The films were soaked in water for several days and dried in vacuo. They were dark yellow, strong, flexible and could be hot drawn (e.g., 2.2× at 250° C.) with apparent gain in strength. The inherent viscosity in conc. sulfuric acid at 30° C., was 1.40.

Example IV.—Poly(isophthalamide) of 4,4'-bis(4-aminophenoxy)azobenzene

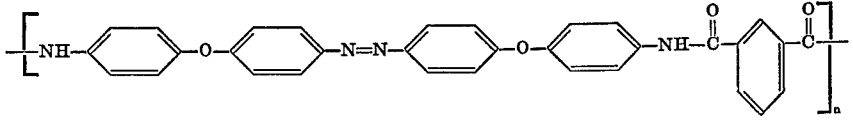

Isophthaloyl chloride (0.406 g., 0.002 mole) was added in one portion to a chilled solution of 0.79 g. (0.002 mole) of 4,4'-bis(4-aminophenoxy)azobenzene in 7 ml. of DMAc. The dark brown dope was stirred at 0° C. for 5 min. and overnight at ambient temperature. After neutralization with lithium carbonate (0.14 g.) the dope was cast into yellow films which were strong, flexible and hot-drawable (2.6× at 250° C.) with apparent gain of strength. Inherent viscosity (solution of 0.1 g. of polymer in 20 ml. of conc. $H_2SO_4$, 30° C.) of the polymer: 1.4.

Example V.—Poly(isophthalamide) of 4-amino-4'-(4-aminophenylazo)azobenzene

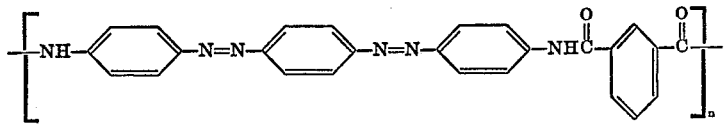

Isophthaloyl chloride (0.203 g., 1 mmole) was added to a chilled solution of 0.316 g. (1 mmole) of 4-amino-4'-(4-aminophenylazo)-azobenzene in 5 ml. of DMAc/5% LiCl. The reaction was conducted at 0° for 5 min. and overnight at room temperature. The red dope was cast into films which were dried initially at 100° C. for 1 hr., then soaked in water for several days and dried in vacuo. The red films were opaque, strong, flexible and could be drawn at elevated temperatures (e.g., 1.73× at 265°) with apparent gain in strength.

We claim:
1. A linear film- or fiber-forming aromatic polyamide consisting essentially of recurring units having the structural formula

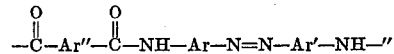

wherein Ar" represents a divalent aromatic radical, Ar and Ar' represent a conjugated or pseudo-conjugated divalent aromatic radical, at least one of Ar and Ar' is a pseudo-conjugated divalent aromatic radical, said radicals have no substituents which are reactive with amino groups or acid halide groups and said pseudo-conjugated divalent aromatic radical contains at least two rings linked by a divalent radical selected from the group consisting of

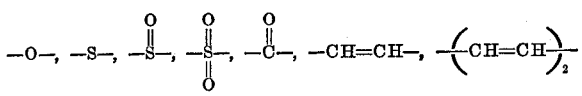

R being a $C_1$–$C_4$ alkyl radical.

2. The polyamide of claim 1 wherein Ar is a conjugated divalent aromatic radical.
3. The polyamide of claim 1 wherein each of Ar and Ar' is a pseudo-conjugated divalent aromatic radical.
4. The polyamide of claim 1 wherein Ar" is para-phenylene, meta-phenylene, naphthalene or a multi-ring radical containing at least two rings linked by a bond between a ring-atom of each of said rings or by a divalent radical selected from the group consisting of

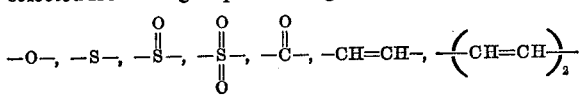
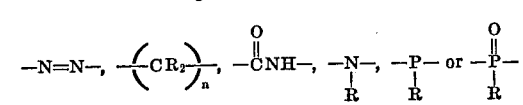

wherein R is $C_1$–$C_4$ alkyl and $n$ is an integer from 1 to 6.

5. The polyamide of claim 1 wherein the amide groups are directly linked to ring atoms in said radicals.
6. The polyamide of claim 1 wherein said radicals have no substituents other than nitro, halo, carboxyl, nitrile, $C_1$–$C_4$ alkyl, $C_1$–$C_4$ alkoxy or $C_2$–$C_5$ carbalkoxy radicals.

7. The polyamide of claim 1 wherein the recurring units have the structural formula 8. A self-supporting film consisting essentially of the polyamide of claim 1.

9. A synthetic fiber consisting essentially of the polyamide of claim 1.

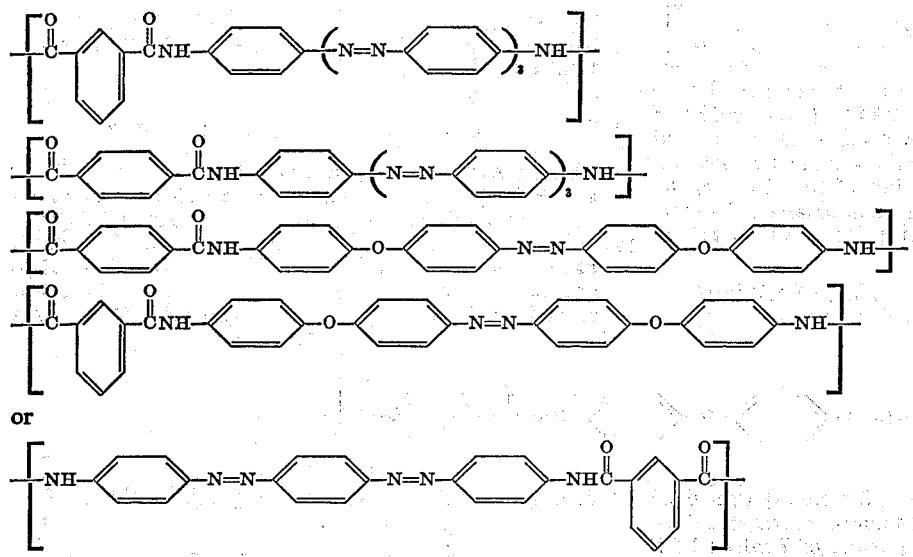

or

References Cited
UNITED STATES PATENTS

| | | | |
|---|---|---|---|
| 3,501,444 | 3/1970 | Bach | 260—78 |
| 2,994,693 | 8/1961 | Blake et al. | 260—144 |
| 3,354,127 | 11/1967 | Hill et al. | 260—78 |
| 3,403,200 | 9/1968 | Randall | 260—857 |

WILLIAM H. SHORT, Primary Examiner

L. L. LEE, Assistant Examiner

U.S. Cl. X.R.

260—2 R, 30.8 R, 32.6 N, 63 R, 65, 78 R